UNITED STATES PATENT OFFICE.

JULIUS LEWY, OF FRANKFORT-ON-THE-MAIN, GERMANY.

ILLUMINANT.

No. 809,121.     Specification of Letters Patent.     Patented Jan. 2, 1906.

Application filed June 20, 1902. Serial No. 112,543.

*To all whom it may concern:*

Be it known that I, JULIUS LEWY, manufacturer, a subject of the King of Prussia, German Emperor, and a resident of Frankfort-on-the-Main, in the Kingdom of Prussia, German Empire, have invented new and useful Improvements in Illuminants, of which the following is a full, clear, and exact specification.

By my invention an alcohol or alcohols are added to transparent substances used in making candles and the like, such as paraffin and the like, and particularly to the transparent mixture of paraffin and stearin (a mixture of stearic acid and palmitic acid) which is used for making so-called "composition candles." This addition has the effect of increasing the illuminating power of the candles, a bigger and whiter flame being produced. The cost of the candles is less and the candle loses the disagreeable smell emitted, particularly in the case of paraffin candles, when it is extinguished. Moreover, paraffin candles lose their transparency and acquire the white color of a good stearic-acid candle, a fact particularly valuable in the manufacture of composition candles. The proportion of alcohol may vary within large limits, and the mixture is made at a temperature suitable to the nature of the materials used. The alcohol or alcohols are mixed with the other substances used while they are in a melted condition during continued stirring, whereby an evaporation of the alcohol is avoided either by keeping the temperature correspondingly low, which is possible on account of the melting-points of the parts used, or by using a closed vessel provided with cooling and stirring means. By an ample stirring a perfectly homogeneous mass is obtained. Good results have, for instance, been obtained according to the following examples. The parts are by weight.

Example 1: Fifteen parts of alcohol are added to a melted mixture of seventy parts of paraffin and fifteen parts of stearin, (mixture of stearic acid and palmitic acid.)

Example 2: Ten parts of alcohol are added to a melted mixture of eighty-five parts of paraffin and five parts of stearin.

Example 3: Five parts of alcohol are added to a melted mixture of eighty-five parts of paraffin and ten parts of stearin.

Example 4: Twelve parts of alcohol are added to a melted mixture of eighty-five parts of paraffin and three parts of stearin.

Example 5: Two parts of alcohol are added to a melted mixture of eighty-five parts of paraffin and thirteen parts of stearin.

In place of the foregoing proportions any of the substances may be used.

Having thus described my invention, I claim as new and desire to secure by Letters Patent—

A wax-like non-transparent composition of matter, containing paraffin, stearin and alcohol so mixed therewith as to impart opacity to the mixture.

In testimony that I claim the foregoing as my invention I have signed my name in presence of two subscribing witnesses.

JULIUS LEWY.

Witnesses:
     JEAN GRUND,
     CARL GRUND.